(12) United States Patent  (10) Patent No.: US 7,563,199 B2
Ringer  (45) Date of Patent: Jul. 21, 2009

(54) APPARATUS AND METHOD FOR CONTROLLING ROTATIONAL SPEED AND DIRECTION OF A CROP SPRAYER

(75) Inventor: Chad A. Ringer, Trafalgar, IN (US)

(73) Assignee: Equipment Technology, Inc., Mooresville, IN (US)

(*) Notice: Subject to any disclaimer, the term of this patent is extended or adjusted under 35 U.S.C. 154(b) by 333 days.

(21) Appl. No.: 11/476,319

(22) Filed: Jun. 28, 2006

(65) Prior Publication Data

US 2008/0051255 A1 Feb. 28, 2008

(51) Int. Cl.
*B60W 10/06* (2006.01)
*B60W 10/10* (2006.01)

(52) U.S. Cl. .................................................. 477/165

(58) Field of Classification Search ............... 477/165; 74/473.19, 473.33, 473.34, 473.35, 471 XY
See application file for complete search history.

(56) References Cited

U.S. PATENT DOCUMENTS

| | | | | |
|---|---|---|---|---|
| 1,968,482 A * | 7/1934 | Eisenhauer | ............... | 477/165 |
| 2,257,852 A * | 10/1941 | Nicol | ............... | 477/165 |
| 2,495,993 A * | 1/1950 | Wallace | ............... | 477/165 |
| 3,795,157 A * | 3/1974 | Campbell et al. | ............... | 477/165 |
| 4,109,745 A * | 8/1978 | Hveem | ............... | 180/333 |
| 4,137,799 A * | 2/1979 | Olsen et al. | ............... | 477/113 |
| 4,381,839 A | 5/1983 | Engler et al. | | |
| 5,092,422 A | 3/1992 | Hood, Jr. et al. | | |
| 5,233,525 A * | 8/1993 | Overmann et al. | ............... | 701/55 |
| 5,755,382 A | 5/1998 | Skotinkov | | |
| 5,833,578 A * | 11/1998 | Potis | ............... | 477/165 |
| 6,022,291 A | 2/2000 | Weddle | | |
| 6,070,539 A | 6/2000 | Flamme et al. | | |
| 6,131,062 A * | 10/2000 | Nielsen | ............... | 701/50 |
| 6,311,795 B1 | 11/2001 | Skotnikov et al. | | |
| 6,411,880 B1 * | 6/2002 | McKee et al. | ............... | 701/55 |
| 6,523,636 B2 | 2/2003 | Chatterjea | | |
| 6,530,293 B1 * | 3/2003 | Ruckert et al. | ............... | 74/473.12 |
| 6,601,670 B2 | 8/2003 | Kaneda et al. | | |
| 2003/0172762 A1 | 9/2003 | Ehermaier et al. | | |
| 2005/0231475 A1 | 10/2005 | Law et al. | | |
| 2006/0095186 A1* | 5/2006 | Hendron et al. | ............... | 701/50 |

* cited by examiner

*Primary Examiner*—Sherry Estremsky
(74) *Attorney, Agent, or Firm*—Maginot, Moore & Beck

(57) ABSTRACT

A crop sprayer control assembly includes a hand-operated control device with an up-throttle sensor operably connected to the hand-operated control device. A down-throttle sensor, an up-shift sensor and a down-shift sensor are also operably connected to the hand-operated control device.

23 Claims, 4 Drawing Sheets

APPARATUS AND METHOD FOR CONTROLLING ROTATIONAL SPEED AND DIRECTION OF A CROP SPRAYER

FIELD

The present invention relates generally to a crop sprayer, and more particularly to an apparatus and method for controlling rotational speed and direction of a drive shaft of a crop sprayer.

BACKGROUND

A crop sprayer is used to distribute chemicals, such as herbicides, pesticides, and fertilizer, over crops in a field during a spraying operation. In order to maneuver the crop sprayer around the field during the spraying operation, an operator of the crop sprayer operates various controls which affect speed and direction of the crop sprayer. The speed and direction of the crop sprayer is directly related to the rotational speed and direction of a drive shaft of the crop sprayer.

Typically, one control allows the operator to selectively couple and decouple an engine crankshaft of the crop sprayer from the drive shaft. Another control allows the operator to selectively change the gear ratio between the engine crankshaft and the drive shaft. Still another control allows the operator to selectively increase and decrease rotational speed of the engine crankshaft.

By way of example, to control the movement of a conventional tractor, a foot activated clutch is used to selectively couple and decouple the engine crankshaft from the drive shaft, a hand actuated gear selector is used to selectively change the gear ratio between the engine crankshaft and the drive shaft, and a foot actuated throttle is used to control the rotational speed of the engine crankshaft.

In addition to the controls which the operator must operate in order to maneuver a crop sprayer around a field, the crop sprayer also includes other controls which operate the chemical spraying features of the crop sprayer. By way of example, the crop sprayer generally has a boom arm control which raises, lowers, extends, and retracts a boom arm which includes a number of spray nozzles. The crop sprayer further has a spray control which adjusts the flow rate of chemicals from a storage tank through the spray nozzles mounted on the boom arm.

Obviously, as the number of controls for various functions of a device increases, operation of the device becomes increasingly difficult. Moreover, coordinating operation of various controls, such as a clutch, a brake and the throttle, can be challenging, particularly when the controls are spatially separated.

One approach to reduce the burden on the operator of a crop sprayer is to utilize a hydrostatic drive system in the crop sprayer. A hydrostatic drive system includes a hand lever which when manipulated causes a hydraulic fluid to be advanced within the system so as to cause rotation of the wheels of the crop sprayer at a desired rotational speed and direction. Thus, use of the hydrostatic drive system eliminates the need for an operator to (i) use his foot to activate a clutch to selectively couple and decouple the engine crankshaft from the drive shaft, and (ii) to use his foot to selectively actuate the throttle to control the speed of the engine crankshaft. A separate control may be used to selectively change the gear ratio between the engine crankshaft and the drive shaft. Consequently, the use of a hydrostatic drive system enables an operator to maneuver the crop sprayer around the field with a fewer number of separate controls thereby reducing the burden on the operator of the crop sprayer.

One drawback of a hydrostatic drive system is that hydrostatic drive systems are typically heavy, complex, and expensive. The weight of a hydrostatic drive system inhibits mobility of a crop sprayer, especially in soft terrain. Wider tires can be used to distribute the weight of the crop sprayer over a larger area so as to increase mobility. The use of wider tires, however, requires an additional distance to be provided between adjacent rows of the crop in order to ensure that the crops being sprayed are not damaged by the tires during a spraying operation. This reduces the number of crops that may be planted for a given area. Alternatively, an operator may choose to maintain the same row separation resulting in a reduced clearance between the tires and the crops. Maintaining the wheels within a relatively narrow space, however, increases the required level of concentration and increases the amount of tension and fatigue experienced by an operator.

What is needed therefore is an apparatus and method for reducing the number of separate controls required to control the movement and operation of a crop sprayer without significantly increasing the weight of the crop sprayer.

SUMMARY

In accordance with one embodiment of the present invention, there is provided a crop sprayer control assembly that includes a hand-operated control device. An up-throttle sensor, a down-throttle sensor, an up-shift sensor and a down-shift sensor are operably connected to the hand-operated control device.

In accordance with another embodiment of the present invention, there is provided a crop sprayer speed control assembly with a joystick having a first position and a first sensor is associated with the first position. The assembly includes a memory with first stored instructions which, when executed, determine that the first sensor has sensed the joystick in the first position, issue a first signal operable to change the rotational speed of the crop sprayer engine, continue to change the rotational speed of the engine for so long as the first sensor senses the joystick in the first position, and terminates the change in the rotational speed of the engine when the first sensor no longer senses the joystick in the first position. The assembly also includes a microprocessor that executes the instructions stored in the memory.

In accordance with one method of the present invention, the speed and direction of a drive shaft on a crop sprayer is controlled by moving a control stick from a first position to a second position, generating a first signal based upon the movement of the control stick to the first position, changing the rotational speed of the crop sprayer drive shaft based upon the first signal, moving the control stick from the second position to the first position, and terminating the change in the rotational speed of the drive shaft when the control stick is moved from the second position to the first position.

In accordance with another method of the present invention, the drive shaft on a crop sprayer is controlled by sensing a control stick positioned in a first position with a first sensor, providing a first sensor output based upon the sensing of the control stick, changing the rotational speed of the crop sprayer drive shaft based upon the first sensor output, and terminating the change in the rotational speed of the drive shaft when the first sensor no longer senses the control stick in the first position or a first predetermined rotational speed of the drive shaft has been achieved.

DESCRIPTION

Figure 1:
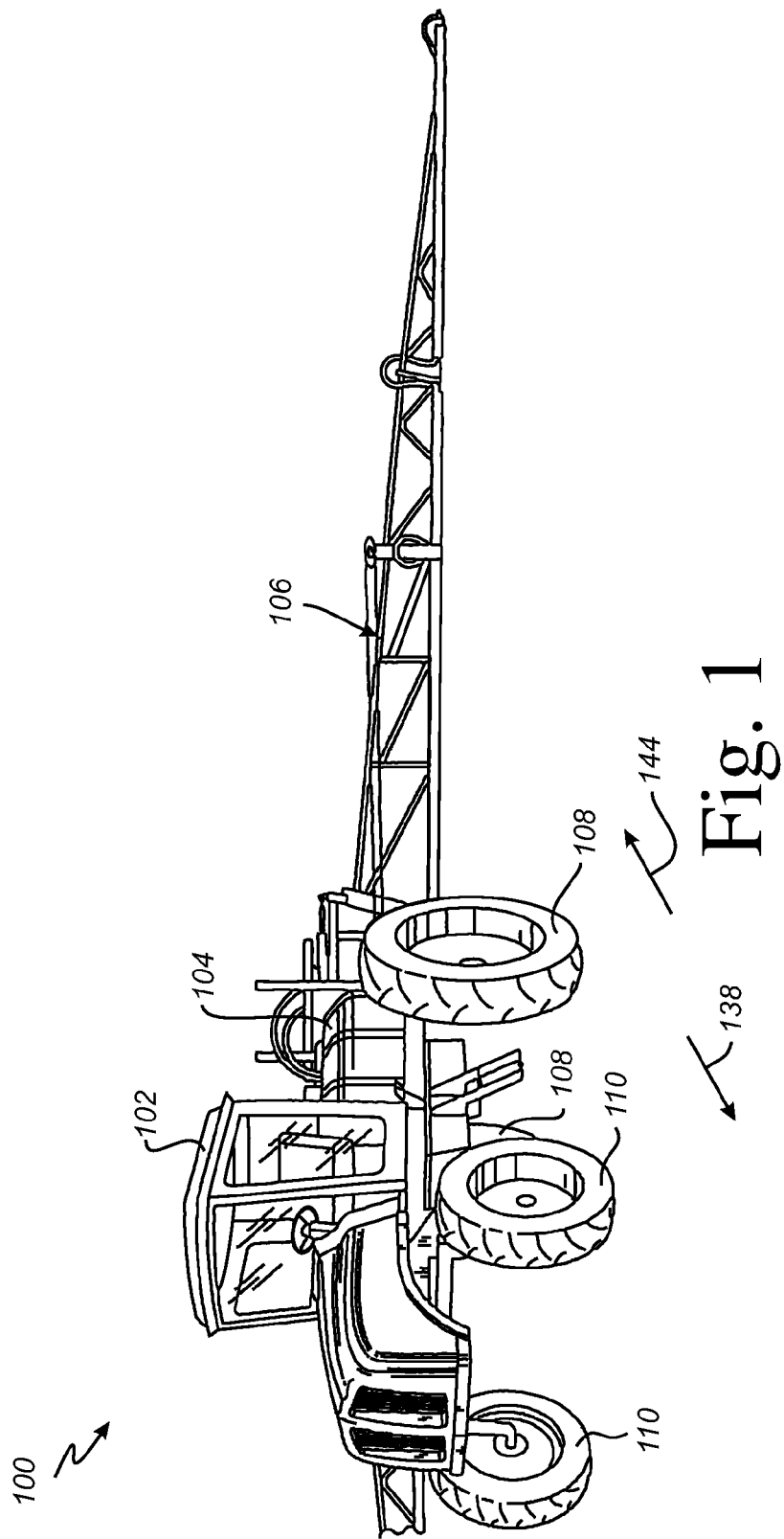
FIG. 1 shows a perspective view of a crop sprayer in accordance with features of the present invention.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a crop sprayer 100. The crop sprayer 100 includes a cab 102 which houses an operator and a number of controls. The crop sprayer 100 further includes a chemical tank 104 which stores chemicals, such as herbicides, pesticides, and fertilizers. The crop sprayer 100 further includes a boom arm 106 which is operable to distribute the chemicals over a wide swath in a field. In particular, the chemicals are distributed by nozzles (not shown) spaced along the boom arm 106 through which the chemicals are sprayed as the crop sprayer 100 is propelled. In alternative embodiments, the storage tank and boom assembly may be located at different locations on the crop sprayer such as at the front end of the crop sprayer.

The crop sprayer 100 further includes a pair of rear wheels 108 and a pair of front wheels 110. The rear wheels 108 are driven by a drive train assembly 112 (shown in FIG. 2) so as to propel the crop sprayer 100 in the desired direction. The front wheels 110 are operable to steer the crop sprayer 100.

Figure 2:
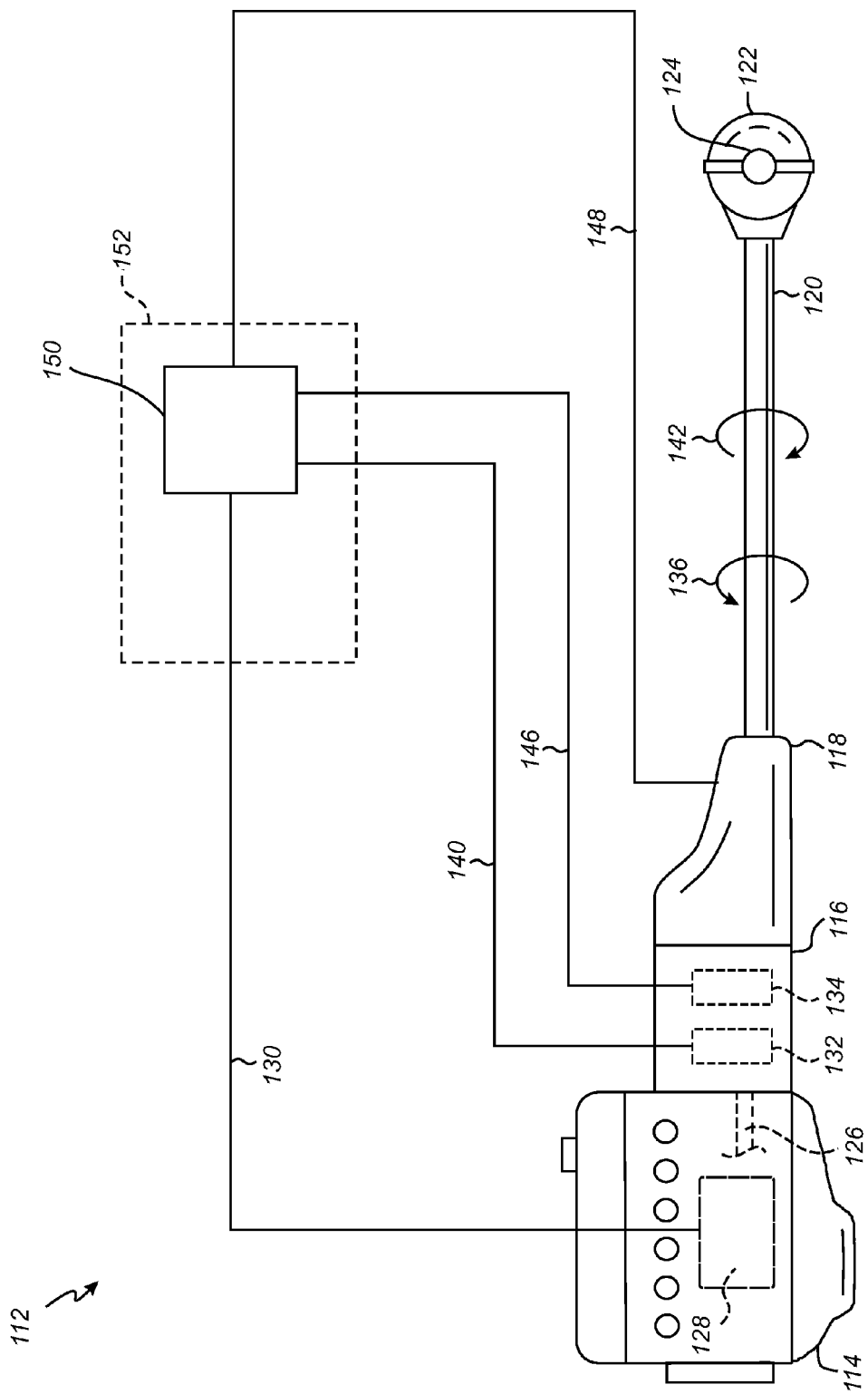
FIG. 2 shows a schematic view of a drive train assembly and crop sprayer control assembly of the crop sprayer of FIG. 1.

Referring now to FIG. 2, there is shown the drive train assembly 112 of the crop sprayer 100. The drive train assembly 112 includes an engine 114, a clutch assembly 116, a transmission 118, a drive shaft 120, a rear differential 122 and a differential output shaft 124. The clutch assembly 116, the transmission 118, the drive shaft 120 and the rear differential 122 and the differential output shaft 124 in this embodiment are commercially available as a matched set from International Transmissions LTD of Wrexham, United Kingdom as transmission and axle package 475/45200.

The engine 114 may be a diesel engine commercially available from Cummins Engine Co. Inc., of Columbus, Ind. or Deere & Company of Moline Ill. Diesel engines have several advantages including high torque output, reliability, and low fuel cost. The engine 114 generates rotational mechanical energy which is transferred to the clutch assembly 116 by a crankshaft 126 of the engine 114. While the embodiment of FIG. 1 shows the engine 114 mounted at the front end of the crop sprayer 100, in alternative embodiments, the engine may be mounted elsewhere on the crop sprayer such as at the rear of the crop sprayer.

The engine 114 includes a throttle 128. The throttle 128 is operable to control rotational speed of the crankshaft 126 of the engine 114. In particular, the throttle 128 controls the amount of air that is advanced into a combustion chamber (not shown) of the engine 114. As the amount of air advanced into the combustion chamber is increased, the flow of fuel injected into the combustion chamber is similarly increased. By increasing the amount of fuel and air combusted in the combustion chamber of the engine 114, the rotational speed of the crankshaft 126 of the engine 114 is increased. A signal is sent over a signal line 130 to control the position the throttle 128 during operation of the engine 114 so as to control the rotational speed of the crankshaft 126.

The clutch assembly 116 is positioned between the engine 114 and the drive shaft 120. The clutch assembly 116 includes a torque converter which has a forward clutch 132 and a reverse clutch 134. The forward clutch 132 is operable to selectively couple and decouple the crankshaft 126 of the engine 114 and the drive shaft 120. In particular, when the forward clutch 132 couples the crankshaft 126 to the drive shaft 120, the drive shaft 120 is caused to rotate in a clockwise rotational direction, as indicated by the arrow 136. When the drive shaft 120 rotates in the clockwise rotational direction 136, the rear wheels 108 are rotated so as to advance the crop sprayer 100 in the forward direction indicated by the arrow 138 in FIG. 1. Whereas, when the forward clutch 132 decouples the crankshaft 126 from the drive shaft 120, the drive shaft 120 is not caused to rotate in the direction of the arrow 136. As a result, when the forward clutch 132 decouples the crankshaft 126 from the drive shaft 120, the engine 114 does not cause the rear wheels 108 to rotate so as to advance the crop sprayer 100 in the forward direction.

The forward clutch 132 is actuated so as to couple the crankshaft 126 to the drive shaft 120 in response to an electric signal being received via a signal line 140. In particular, when an "on" signal is received by the forward clutch 132 via the signal line 140, the forward clutch 132 couples the crankshaft 126 to the drive shaft 120 so as to rotate the drive shaft 120 in the clockwise rotational direction. When an "off" signal is received by the forward clutch 132 via the signal line 140, the forward clutch 132 decouples the crankshaft 126 from the drive shaft 120.

Similarly, the reverse clutch 134 is operable to selectively couple and decouple the crankshaft 126 of the engine 114 and the drive shaft 120. In particular, when the reverse clutch 134 couples the crankshaft 126 to the drive shaft 120, the drive shaft 120 is caused to rotate in a counterclockwise rotational direction, as indicated by the arrow 142. When the drive shaft 120 rotates in the counterclockwise rotational direction, the rear wheels 108 are rotated so as to advance the crop sprayer 100 in the reverse direction as indicated by the arrow 144 in FIG. 1. When the reverse clutch 134 decouples the crankshaft 126 from the drive shaft 120, the drive shaft 120 is not caused to rotate in the counterclockwise rotational direction indicated by the arrow 142. As a result, when the reverse clutch 134 decouples the crankshaft 126 from the drive shaft 120, the engine 114 does not cause the rear wheels 108 to rotate so as to advance the crop sprayer 100 in the reverse direction.

The reverse clutch 134 is actuated so as to couple the crankshaft 126 to the drive shaft 120 in response to an electric signal being received via a signal line 146. In particular, when an "on" signal is received by the reverse clutch 134 via the signal line 146, the reverse clutch 134 couples the crankshaft 126 to the drive shaft 120 so as to rotate the drive shaft 120 in the counterclockwise rotational direction. When an "off" signal is received by the reverse clutch 134 via the signal line 146, the reverse clutch 134 decouples the crankshaft 126 from the drive shaft 120.

The transmission 118 is interposed between the clutch assembly 114 and the drive shaft 120. The transmission 118 in this embodiment is a four speed transmission which provides four separate gear ratios between the crankshaft 126 and the drive shaft 120. The transmission 118 allows the operator to selectively change the gear ratio between the clutch assembly 116 and the drive shaft 120. In particular, when an "up-shift" signal is received by the transmission 118 via the signal line 148, the transmission 118 decouples the previously selected gear from the forward clutch 132 and couples the gear with the next highest gear ratio to the forward clutch 132 so as to rotate the drive shaft 120 at a higher rotational speed but with less torque. When a "down-shift" signal is received by the transmission 118 via the signal line 148, the transmission 118 decouples the previously selected gear from the forward clutch 132 and couples the gear with the next lowest gear ratio to the forward clutch 132 so as to rotate the drive shaft 120 at a lower rotational speed but with more torque. Thus, the change of gear ratios allows the engine 114 to provide torque to the rear wheels 108 for a variety of operating conditions. In particular, a gear ratio may be selected that provides high torque at low crankshaft speeds whereas a different gear ratio may be selected that provides low torque at high crankshaft speeds.

The drive shaft 120 is operatively coupled to the rear differential 122 and the differential output shaft 124. The rear differential 122 splits the power from the drive shaft 120 between each of the rear wheels 108 (shown in FIG. 1) in order to propel the crop sprayer 100 in the forward direction and the reverse direction.

The signal lines 130, 140, 146 and 148 extend between a microprocessor 150 and the respective component. The microprocessor 150 is part of a crop sprayer control assembly 152 which is shown in more detail in FIG. 3. The crop sprayer control assembly 152 includes a convenience tray 154, an arm rest 156 a joystick 158 and a control and display panel 160. The control and display panel 160 includes a display 162 and a number of control switches 164. The display 162 is configured to provide status and alarm information for the various systems of the crop sprayer 100 such as fuel, hydraulic system parameters, boom condition, chemical tank level, etc. The control switches 164 are used to control the various systems.

The joystick 158 includes a knob 166 and a shaft 168. A forward gear control button 170 and a reverse gear control button 172 are located on the side of the shaft 168 farthest away from the armrest 156. The placement of the forward gear control button switch 170 and the reverse gear control button switch 172 allows the buttons to be depressed when an operator grasps the shaft 168. Manipulation of the knob 166, however, is unlikely to result in inadvertent manipulation of the buttons.

The joystick 158 is biased toward a neutral position wherein it is aligned with the axis 174. The joystick may be pivoted forward and backward within a first plane through the axis 174 in the directions indicated by the arrows 176 and 178. The joystick 158 may further be pivoted from one side to the other side within a second plane through the axis 174 as indicated by the arrows 180 and 182. Movement of the joystick 158 and manipulation of the forward gear control button switch 170 and the reverse gear control button switch 172 is detected by various sensors which are shown in FIG. 4.

The sensors associated with the joystick 158 include an up-throttle sensor 184, a down-throttle sensor 186, an up-shift sensor 188, a down-shift sensor 190, a forward engage sensor 192 and a reverse engage sensor 194. The up-throttle sensor 184 is configured to sense when the joystick 158 is pivoted in the direction of the arrow 176 and the down-throttle sensor 186 is configured to sense when the joystick 158 is pivoted in the direction of the arrow 178. In this embodiment, the up-throttle sensor 184 and the down-throttle sensor 186 are configured to generate either a high signal or a low signal, depending upon whether or not the joystick 158 is sensed. Thus, the sensors provide a digital output. In an alternative embodiment, the sensors may be configured to be analog sensors, providing a varying output dependent upon the sensed magnitude of deflection of the joystick 158 toward the first or second position. This alternative configuration is useful when providing for a varying rate of throttle increase or decrease.

Figure 4:
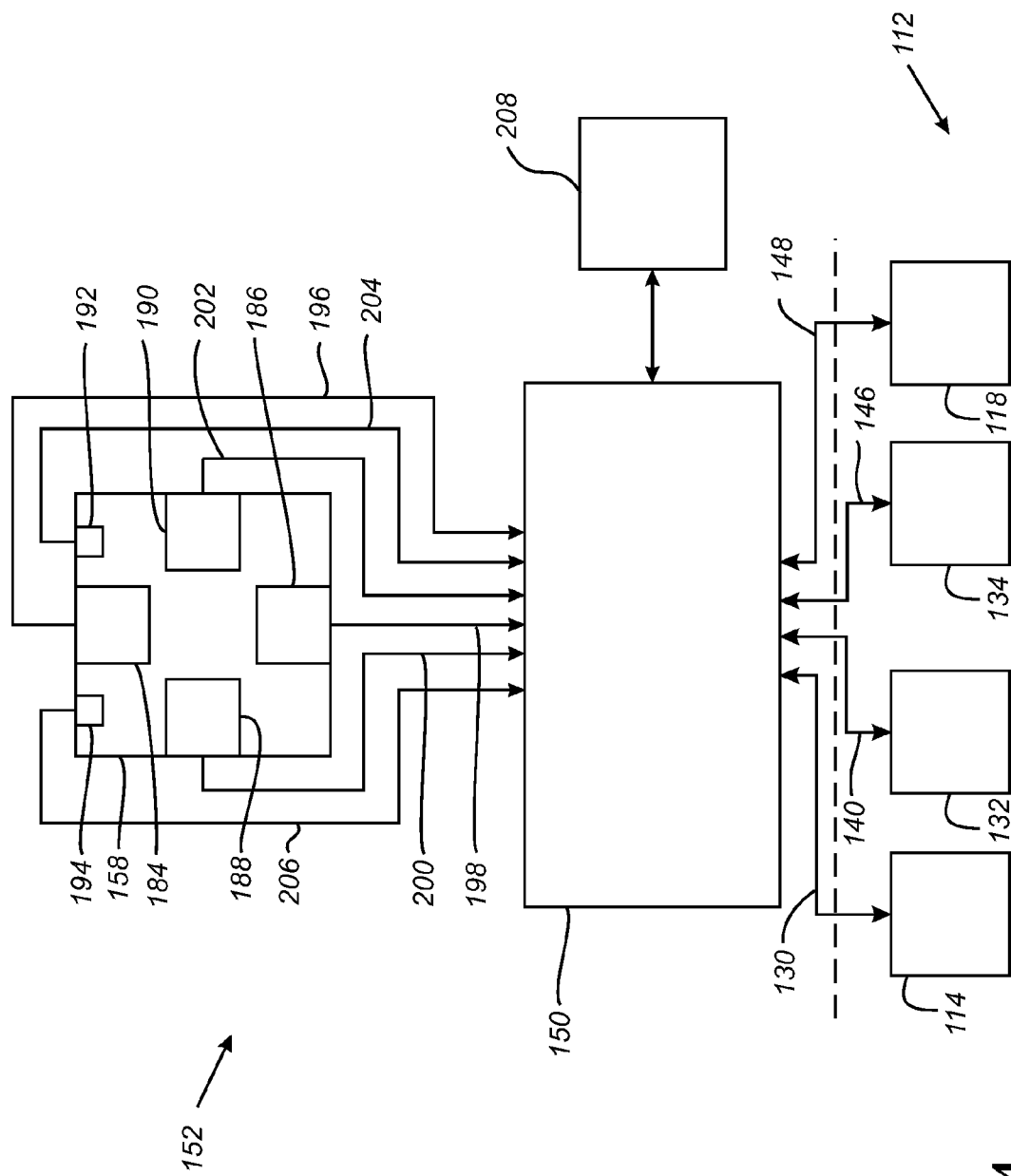
FIG. 4 shows a schematic view of the drive train assembly and the crop sprayer control assembly of FIG. 3.

Continuing with FIG. 4, the down-shift sensor 190 is configured to sense when the joystick 158 is pivoted in the direction of the arrow 180 and the up-shift sensor 188 is configured to sense when the joystick 158 is pivoted in the direction of the arrow 182. Finally, the forward engage sensor 192 is configured to sense depression of the forward gear control button switch 170 and the reverse engage sensor 194 is configured to sense depression of the reverse gear control button switch 172.

Each of the sensors provides a signal to the microprocessor 150 over one of the signal lines 196, 198, 200, 202, 204 or 206. The microprocessor 150 evaluates the incoming signals from the signal lines 196, 198, 200, 202, 204 and 206 along with status data from the drive train assembly 112 and, based upon instructions stored in the memory 208, issues control signals to actuators associated with the various components of the drive train assembly 112.

To move the crop sprayer 100 beginning with the engine 114 turning the crankshaft 126 but with no clutch engaged, an operator first manipulates either the forward gear control button switch 170 or the reverse gear control button switch 172. When the forward gear control button switch 170 is manipulated, the forward engage sensor 192 senses the manipulation and generates a signal that is sent to the microprocessor 150 through the signal line 204. The microprocessor 150 then determines that the forward clutch 132 is not engaged based upon a signal from the signal line 140 and that the reverse clutch 134 is not engaged based upon a signal from the signal line 146. Therefore, based upon instructions stored in the memory 208, the microprocessor 150 generates a control signal which is sent via the signal line 140 controlling an actuator so as to engage the forward clutch 132 and the crankshaft 126. Thus, rotation of the crankshaft 126 is passed through the forward clutch 132 to the drive shaft 120, causing the drive shaft 120 to rotate in the direction of the arrow 136 (FIG. 2) so as to propel the crop sprayer 100 in the forward direction indicated by the arrow 138 of FIG. 1.

In the event the forward clutch 132 is engaged when the microprocessor 150 receives a signal through the signal line 204, the instructions stored in the memory 208 in this embodiment, when executed by the microprocessor 150 will cause a signal to be sent to the actuator for the forward clutch 132 causing the forward clutch 132 to be disengaged from the crankshaft 126. Similarly, if the reverse clutch 134 is engaged when the microprocessor 150 receives a signal through the signal line 204, the instructions stored in the memory 208 in this embodiment, when executed by the microprocessor 150 will cause a signal to be sent to the actuator for the reverse clutch 134 causing the reverse clutch 134 to be disengaged from the crankshaft 126.

If the reverse gear control button switch 172 is manipulated instead of the forward gear control button switch 170, the reverse engage sensor 194 senses the manipulation and generates a signal that is sent to the microprocessor 150 through the signal line 206. The microprocessor 150 then determines that the forward clutch 132 is not engaged based upon a signal from the signal line 140 and that the reverse clutch 134 is not engaged based upon a signal from the signal line 146. Therefore, based upon instructions stored in the memory 208, the microprocessor 150 generates a control signal which is sent via the signal line 146 controlling an actuator so as to engage the reverse clutch 134 to the crankshaft 126. Thus, rotation of the crankshaft 126 is passed through the reverse clutch 134 to the drive shaft 120, causing the drive shaft 120 to rotate in the direction of the arrow 142 (FIG. 2) so as to propel the crop sprayer 100 in the rearward direction indicated by the arrow 144 of FIG. 1.

In the event the forward clutch 132 is engaged when the microprocessor 150 receives a signal through the signal line 206, the instructions stored in the memory 208 in this embodiment, when executed by the microprocessor 150 will cause a signal to be sent to the actuator for the forward clutch 132 causing the forward clutch 132 to be disengaged from the crankshaft 126. Similarly, if the reverse clutch 134 is engaged when the microprocessor 150 receives a signal through the signal line 206, the instructions stored in the memory 208 in this embodiment, when executed by the microprocessor 150 will cause a signal to be sent to the actuator for the reverse clutch 134 causing the reverse clutch 134 to be disengaged from the crankshaft 126.

Additional data may be considered by the microprocessor 150 prior to engaging or disengaging a clutch. By way of example, the speed and direction of rotation of the drive shaft 120 may be provided to the microprocessor 150. Accordingly, an instruction may be stored in the memory 208 the execution of which only allows a clutch to be engaged if the drive shaft 120 is not rotating. Alternatively, a small amount of rotation in the direction opposite to the clutch to be engaged may be allowed. This reduces wear on the system in the event one of the gear control button switches is inadvertently depressed twice. In one embodiment, a clutch is allowed to be engaged so long as the drive shaft 120 is rotating in the opposite direction at a speed corresponding to about 3 miles per hour.

Figure 3:
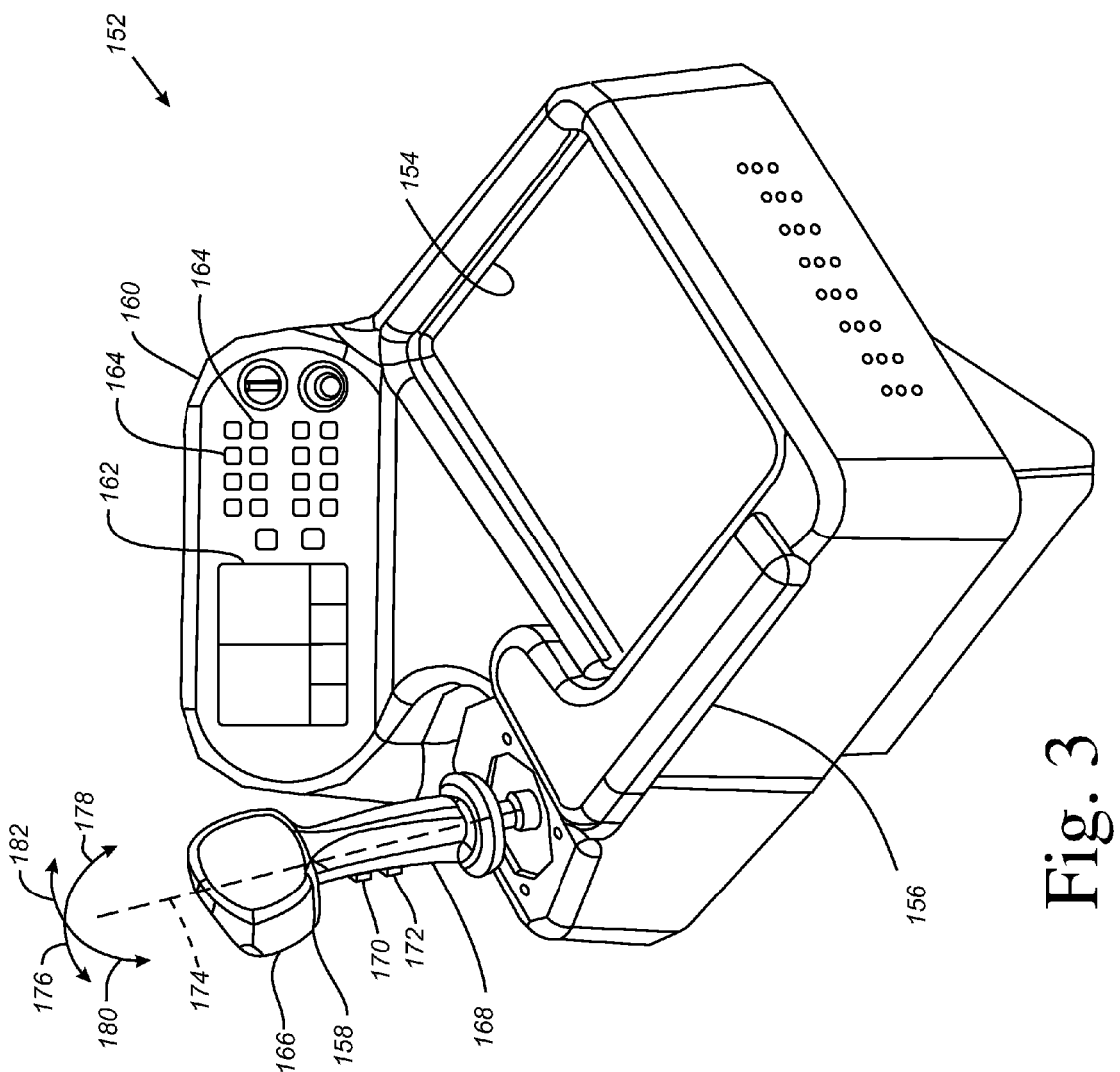
FIG. 3 shows a perspective view of the control console of FIG. 2.

Deflection of the joystick 158 in the direction of the arrow 182 of FIG. 3 is sensed by the up-shift sensor 188 and a signal is sent to the microprocessor 150 over the signal line 200. The microprocessor 150 then determines the status of the forward clutch 132, the reverse clutch 134 and the transmission 118 using one or more inputs from the signal lines 140, 146 and 148, respectively. If the reverse clutch 134 is engaged, then the microprocessor 150 ignores the signal since, in this embodiment, there is only a single reverse gear. Likewise, if the forward clutch 132 is not engaged, the signal is ignored. Alternatively, a warning signal may be sent to the display 162. In the event more than one reverse gear is available, then the microprocessor will command the drive train components 112 in a manner similar to the following process which is performed when the forward clutch 132 is engaged.

If the microprocessor 150 determines that the forward clutch 132 is engaged, the actual gear in the transmission 118 that is engaged to the crankshaft 126 through the forward clutch 132 is determined. If the engaged gear in the transmission 118 is the gear with the highest gear ratio then the signal from the up-shift sensor 188 is ignored. If the gear that is engaged in the transmission 118 is not the gear with the highest gear ratio, then the microprocessor 150, based upon stored instructions in the memory 208, sends a signal over the line 140 so as to control the actuator for the forward clutch 132 to disengage the forward clutch 132 from the crankshaft 126. Then, a signal is sent over the signal line 148 to the transmission 118 selecting the gear with the next highest gear ratio compared to the previously engaged gear. Finally, the microprocessor 150 sends a signal over the line 140 so as to control the actuator for the forward clutch 132 to engage the forward clutch 132 with the crankshaft 126. Thus, rotational movement of the crankshaft 126 is passed through a gear in the transmission 118 with a higher gear ratio.

Deflection of the joystick 158 in the direction of the arrow 180 of FIG. 3 is sensed by the down-shift sensor 190 and a signal is sent to the microprocessor 150 over the signal line 202. The microprocessor 150 then determines the status of the forward clutch 132, the reverse clutch 134 and the transmission 118 using signals from the signal lines 140, 146 and 148, respectively. If the reverse clutch 134 is engaged or the forward clutch 132 is not engaged, the signal is ignored or a warning signal may be generated.

If the microprocessor 150 determines that the forward clutch 132 is engaged, the actual gear in the transmission 118 that is engaged to the crankshaft 126 through the forward clutch 132 is determined. If the engaged gear in the transmission 118 is the gear with the lowest gear ratio then the signal from the down-shift sensor 190 is ignored. If the gear that is engaged in the transmission 118 is not the gear with the lowest gear ratio, then the microprocessor 150, based upon stored instructions in the memory 208, sends a signal over the line 140 so as to control the actuator for the forward clutch 132 to disengage the forward clutch 132 from the crankshaft 126. Then, a signal is sent over the signal line 148 to the transmission 118 selecting the gear with the next lowest gear ratio compared to the previously engaged gear. Finally, the microprocessor 150 sends a signal over the line 140 so as to control the actuator for the forward clutch 132 to engage the forward clutch 132 with the crankshaft 126. Thus, rotational movement of the crankshaft 126 is passed through a gear in the transmission 118 with a lower gear ratio.

If desired, the microprocessor 150 may be configured to further process available data prior to actually shifting gears in the manner described above. By way of example, a signal corresponding to the current rotational speed and direction of the drive shaft 120 may be provided to the microprocessor 150. Based upon the rotational speed of the drive shaft 120, the microprocessor may delay the actual gear shift, particularly when up-shifting, until the rotational speed of the drive shaft 120 has been increased to a predetermined level. This reduces the amount of shock to the system because of the change in torque resulting from the higher gear ratio. Additional inputs, such as current torque on various parts of the system, may also be used.

Deflection of the joystick 158 in the direction of the arrow 176 of FIG. 3 is sensed by the up-throttle sensor 184 and a signal is sent to the microprocessor 150 over the signal line 196. The microprocessor 150 then determines the status of the throttle 128 using a signal from the signal line 130. If the throttle 128 is fully open or at the upper limit, then the signal is ignored or a warning signal may be generated.

If the microprocessor 150 determines that the throttle 128 is not fully opened, then the microprocessor 150, based upon stored instructions in the memory 208, sends a signal over the line 130 so as to control the actuator for the throttle 128 to control the throttle 128 toward the full open position at a predetermined rate of opening. The microprocessor 150 controls the throttle 128 so as to continue opening for so long as the up-throttle sensor 184 senses that the joystick 158 is deflected. As the throttle 128 is opened, the amount of fuel introduced into the combustion chambers of the engine 114 is increased causing an increase in the rotational speed of the crankshaft 126. Thus, the rotation of the driveshaft 120 is increased, causing the crop sprayer 100 to accelerate.

Once the desired speed is achieved, the operator releases the joystick 158 which is biased toward the neutral position. As the joystick 158 moves to the neutral position, the up-throttle sensor 184 will lose the ability to sense the joystick 158 and the signal is removed from the signal line 196. The microprocessor 150 then removes the signal from the signal line 130 and the throttle 128 is maintained at the resulting position.

Alternative instructions may be stored in the memory 208 for execution by the microprocessor 150. By way of example, but not of limitation, the microprocessor may be configured to modify a speed set point based upon the deflection of the joystick 158. In one such embodiment, a set point speed is indicated on the display 162. In response to a deflection of the joystick 158, the set point speed is increased. When the desired set point speed is displayed, the operator releases the joystick. Meantime, the microprocessor determines a discrepancy between the set point speed and the actual speed, and controls the throttle as necessary to increase the actual speed to the set point speed.

Deflection of the joystick 158 in the direction of the arrow 178 of FIG. 3 is sensed by the down-throttle sensor 186 and a signal is sent to the microprocessor 150 over the signal line 198. The microprocessor 150 then determines the status of the throttle 128 using a signal from the signal line 130. If the throttle 128 is at its lower limit, then the signal is ignored or a warning signal may be generated.

If the microprocessor 150 determines that the throttle 128 is not at the lower limit, then the microprocessor 150, based upon stored instructions in the memory 208, sends a signal over the line 130 so as to control the actuator for the throttle 128 to control the throttle toward the full shut position at a predetermined rate of closing. The microprocessor 150 controls the throttle 128 so as to continue closing for so long as the down-throttle sensor 186 senses that the joystick 158 is deflected. As the throttle 128 is closed, the amount of fuel introduced into the combustion chambers of the engine 114 is decreased causing a decrease in the rotational speed of the crankshaft 126. Thus, the rotation of the driveshaft 120 is decreased, causing the crop sprayer 100 to decelerate.

Once the desired speed is achieved, the operator releases the joystick 158 which is biased toward the neutral position. As the joystick 158 moves to the neutral position, the down-throttle sensor 186 will lose the ability to sense the joystick 158 and the signal is removed from the signal line 198. The microprocessor 150 then removes the signal from the signal line 130 and the throttle 128 is maintained at the resulting position.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A crop sprayer control assembly comprising:
   a hand-operated control device:
   an up-throttle sensor operably connected to the hand-operated control device;
   a down-throttle sensor operably connected to the hand-operated control device;
   an up-shift sensor operably connected to the hand-operated control device; and
   a down-shift sensor operably connected to the hand-operated control device;
   wherein the hand-operated control device is movable between a first position toward which the control device is biased and each of a second position, a third position, a fourth position and a fifth position;
   wherein the up-throttle sensor is operable to sense when the hand-operated control device is in the second position;
   wherein the down-throttle sensor is operable to sense when the hand-operated control device is in the third position;
   wherein the up-shift sensor is operable to sense when the hand-operated control device is in the fourth position; and
   wherein the down-shift sensor is operable to sense when the hand-operated control device is in the fifth position.

2. The crop sprayer control assembly of claim 1, wherein:
   the hand-operated control device is placed in the second position from the first position by movement of the hand-operated control device within a first plane in a first direction:
   the hand-operated control device is placed in the third position from the first position by movement of the hand-operated control device within the first plane in a second direction;
   the hand-operated control device is placed in the fourth position from the first position by movement of the hand-operated control device within a second plane in a third direction: and
   the hand-operated control device is placed in the fifth position from the first position by movement of the hand-operated control device within the second plane in a fourth direction.

3. A crop sprayer control assembly comprising:
   a hand-operated control device;
   an up-throttle sensor operably connected to the hand-operated control device;
   a down-throttle sensor operably connected to the hand-operated control device;
   an up-shift sensor operably connected to the hand-operated control device;
   a down-shift sensor operably connected to the hand-operated control device;
   a forward gear sensor operably connected to the hand-operated control device; and
   a reverse gear sensor operably connected to the hand-operated control device.

4. The crop sprayer control assembly of claim 3, wherein the forward gear sensor is operable to sense manipulation of a first control button located on the hand-operated device and the reverse gear sensor is operable to sense manipulation of a second control button located on the hand-operated device.

5. The crop sprayer control assembly of claim 4, wherein:
   the hand-operated control device is movable between a first position toward which the control device is biased and each of a second position, a third position, a fourth position and a fifth position;
   the up-throttle sensor is operable to sense when the hand-operated control device is in the second position;
   the down-throttle sensor is operable to sense when the hand-operated control device is in the third position;
   the up-shift sensor is operable to sense when the hand-operated control device is in the fourth position; and
   the down-shift sensor is operable to sense when the hand-operated control device is in the fifth position.

6. The crop sprayer control assembly of claim 5, wherein the hand-operated control device is angularly movable between the first position and each of the second position, the third position, the fourth position and the fifth position.

7. The crop sprayer control assembly of claim 3, further comprising:
   a forward gear actuator controlled to engage the drive shaft of the crop sprayer with a forward gear when the forward gear sensor senses the manipulation of the first control button and the drive shaft is not engaged with a forward gear or a reverse gear and controlled to disengage the drive shaft of the crop sprayer when the forward gear sensor senses the manipulation of the first control button and the drive shaft is engaged with a forward gear or a reverse gear; and
   a reverse gear actuator controlled to engage the drive shaft of the crop sprayer with a reverse gear when the reverse gear sensor senses the manipulation of the second control button and the drive shaft is not engaged with a forward gear or a reverse gear and controlled to disengage the drive shaft of the crop sprayer when the reverse gear sensor senses the manipulation of the second control button and the drive shaft is engaged with a reverse gear or a forward gear.

8. A crop sprayer control assembly comprising:
   a hand-operated control device;
   an up-throttle sensor operably connected to the hand-operated control device;
   a down-throttle sensor operably connected to the hand-operated control device;
   an up-shift sensor operably connected to the hand-operated control device; and
   a down-shift sensor operably connected to the hand-operated control device,
   wherein the hand-operated control device is angularly movable between a first position toward which the control device is biased and a second position, such that when the hand-operated control device is displaced toward the second position, the up-throttle actuator is controlled to accelerate the rotation of the driveshaft of the crop sprayer based upon the angular displacement of the hand-operated control device from the first position toward the second position.

9. The crop sprayer control assembly of claim 8, wherein the rate of acceleration is proportional to the angular displacement of the hand-operated control device from the first position to the second position.

10. A crop sprayer speed control assembly comprising:
    a joystick having a first position;
    a first sensor associated with the first position; and
    a memory including first stored instructions which, when executed,
       determine that the first sensor has sensed the joystick in the first position,
       issue a first signal operable to change the rotational speed of the crop sprayer engine,
       continue to change the rotational speed of the engine until the first sensor no longer senses the joystick in the first position or until a first predetermined rotational speed has been achieved, and
       terminate the change in the rotational speed of the engine when the first sensor no longer senses the joystick in the first position or the first predetermined speed has been achieved; and
    a microprocessor for executing instructions stored in the memory.

11. The crop sprayer speed control assembly of claim 10, wherein the first signal is operable to increase the rotational speed of the engine, the memory further comprising:
    second stored instructions which, when executed,
       determine that a second sensor has sensed the joystick in a second position,
       issue a second signal operable to decrease the rotational speed of the engine,
       continue to decrease the rotational speed of the engine until the second sensor no longer senses the joystick in the second position or until a second predetermined rotational speed has been achieved, and
       terminate the decrease in the rotational speed of the engine when the second sensor no longer senses the joystick in the second position or the second predetermined rotational speed has been achieved.

12. The crop sprayer speed control assembly of claim 11, the memory further comprising:
    third stored instructions which, when executed,
       determine that a third sensor has sensed the joystick in a third position, and
       issue a third signal operable to up-shift the transmission of the crop sprayer; and
    fourth stored instructions which, when executed,
       determine that a fourth sensor has sensed the joystick in a fourth position, and
       issue a fourth signal operable to down-shift the transmission of the crop sprayer.

13. The crop sprayer speed control assembly of claim 12, wherein:
    the first position of the joystick is offset from a neutral position in a first plane by a first angular displacement of the joystick;
    the second position is offset from the neutral position by a second angular displacement of the joystick in the first plane in a direction opposite to the first direction;
    the third position is offset from the neutral position by a third angular displacement of the joystick in a second plane Wherein the second plane intersects the first plane; and
    the fourth position is offset from the neutral position by a fourth angular displacement of the joystick in the second plane in a direction opposite to the third direction.

14. The crop sprayer speed control assembly of claim 10, wherein:
    the first position is located at a first angular displacement within a plane from a neutral position;
    the joystick has a second position located at a second angular displacement within the plane, the first angular displacement located between the second angular displacement and the neutral position; and
    the memory includes first stored instructions which, when executed,
       determine the angular displacement of the joystick from the neutral position toward the second position, and
       issue the first signal operable to change the rotational speed of the crop sprayer engine based upon the angular displacement, such that when the joystick is positioned at the second position, the rate at which the rotational speed of the engine is changed is greater than the rate at which the rotational speed of the engine is changed when the joystick is in the first position.

15. A method of controlling the drive shaft of a crop sprayer comprising:
    sensing a control stick positioned in a first position with a first sensor;
    providing a first sensor output based upon the sensing of the control stick;
    changing the rotational speed of the crop sprayer drive shaft based upon the first sensor output; and terminating the change in the rotational speed of the drive shaft when the first sensor no longer senses the control stick in the first position or a first predetermined rotational speed of the drive shaft has been achieved.

16. The method of claim 15, wherein changing the rotational speed of the crop sprayer drive shaft based upon the first sensor output comprises increasing the rotational speed of the crop sprayer drive shaft, the method further comprising:
sensing the control stick positioned in a second position with a second sensor
providing a second sensor output based upon the sensing of the control stick in the second position;
reducing the rotational speed of the crop sprayer drive shaft based upon the second sensor output; and
terminating the reduction of the rotational speed of the drive shaft when the second sensor no longer senses the control stick in the second position or a second predetermined rotational speed of the drive shaft has been achieved.

17. The method of claim 16, further comprising:
determining with a third sensor that the control stick is in a third position;
providing a third sensor output based upon the sensing of the control stick in the third position;
up-shifting the transmission of the crop sprayer based upon the third sensor output;
determining with a fourth sensor that the control stick is in a fourth position;
providing a fourth sensor output based upon the sensing of the control stick in the fourth position; and
down-shifting the transmission of the crop sprayer based upon the fourth-sensor output.

18. The method of claim 17, further comprising:
detecting manipulation of a first control switch;
engaging the drive shaft through a first clutch assembly based upon the detected manipulation of the first control switch if the drive shaft is not engaged with either the first or a second clutch assembly;
disengaging the drive shaft from the first clutch assembly based upon the detected manipulation of the first control switch if the drive shaft is engaged with the first clutch assembly; and
disengaging the drive shaft from the second clutch assembly based upon the detected manipulation of the first control switch if the drive shaft is engaged with the second clutch assembly.

19. The method of claim 18, further comprising:
detecting manipulation of a second control switch;
engaging the drive shaft through the second clutch assembly based upon the detected manipulation of the second control switch if the drive shaft is not-engaged with either the first or the second clutch assembly;
disengaging the drive shaft from the first clutch assembly based upon the detected manipulation of the second control switch if the drive shaft is engaged with the first clutch assembly; and
disengaging the drive shaft from the second clutch assembly based upon the detected manipulation of the second control switch if the drive shaft is engaged with the second clutch assembly, wherein the first clutch assembly is a forward clutch assembly and the second clutch assembly is a reverse clutch assembly.

20. A method of controlling the speed and direction of a drive shaft on a crop sprayer comprising:
moving a control stick from a first position to a second position;
generating a first signal based upon the movement of the control stick to the second position;
changing the rotational speed of the crop sprayer drive shaft based upon the first signal;
moving the control stick from the second position to the first position; and
terminating the change in the rotational speed of the drive shaft when the control stick is moved from the second position to the first position;
moving the control stick from the first position to a third position;
generating a second signal based upon the movement of the control stick to the third position;
changing the rotational speed of the crop sprayer drive shaft based upon the second signal in a manner different from the change based upon the first signal;
moving the control stick from the third position to the first position; and
terminating the change in the rotational speed of the drive shaft when the control stick is moved from the third position to the first position.

21. The method of claim 20, wherein the first position, the second position and the third position are located at positions within a single plane.

22. A method of controlling the speed and direction of a drive shaft on a crop sprayer comprising:
moving a control stick from a first position to a second position; generating a first signal based upon the movement of the control stick to the second position;
changing the rotational speed of the crop sprayer drive shaft based upon the first signal;
moving the control stick from the second position to the first position; and
terminating the change in the rotational speed of the drive shaft when the control stick is moved from the second position to the first position;
moving the control stick from the first position to a third position;
generating a second signal based upon the movement of the control stick to the third position; and
changing the gear in the transmission which is engaged to the drive shaft based upon the second signal.

23. The method of claim 22, wherein changing the gear in the transmission which is engaged to the drive shaft based upon the second signal comprises changing the gear in the transmission which is engaged to the drive shaft to a gear with a higher ratio, the method further comprising:
moving the control stick from the first position to a fourth position;
generating a third signal based upon the movement of the control stick to the fourth position; and
changing the gear in the transmission which is engaged to the drive shaft based upon the third signal to a gear with a lower ratio.

* * * * *